United States Patent [19]
Wohlabaugh

[11] 3,887,782
[45] June 3, 1975

[54] EDM ELECTRODE VIBRATION CONTROL SYSTEM

[75] Inventor: Leonard M. Wohlabaugh, Miller Place, N.Y.

[73] Assignee: Eltee Pulsitron (Entire), West Caldwell, N.J.

[22] Filed: Oct. 12, 1973

[21] Appl. No.: 406,091

[52] U.S. Cl............. 219/69 V; 219/69 C; 219/69 G
[51] Int. Cl............................................. B23p 1/08
[58] Field of Search............. 219/69 G, 69 C, 69 V; 204/222, 224 M, 225, DIG. 12

[56] References Cited
UNITED STATES PATENTS

| | | |
|---|---|---|
| 3,271,283 | 9/1966 | Clifford et al.............. 219/69 V X |
| 3,371,182 | 2/1968 | Smith............................... 219/69 V |
| 3,717,567 | 2/1973 | Bodine.......................... 219/69 V X |

Primary Examiner—Bruce A. Reynolds
Attorney, Agent, or Firm—Clarence A. O'Brien; Harvey B. Jacobson

[57] ABSTRACT

An EDM electrode is vibrated relative to a workpiece by modulating the servo signal which maintains an optimum spark gap spacing between the electrode and workpiece. The modulating signal is derived from a rectified, sinusoidal oscillating signal of sonic frequency limiting the vibratory stroke of the electrode so as to prevent any decrease in the gap spacing from that of the optimum spark gap.

6 Claims, 4 Drawing Figures

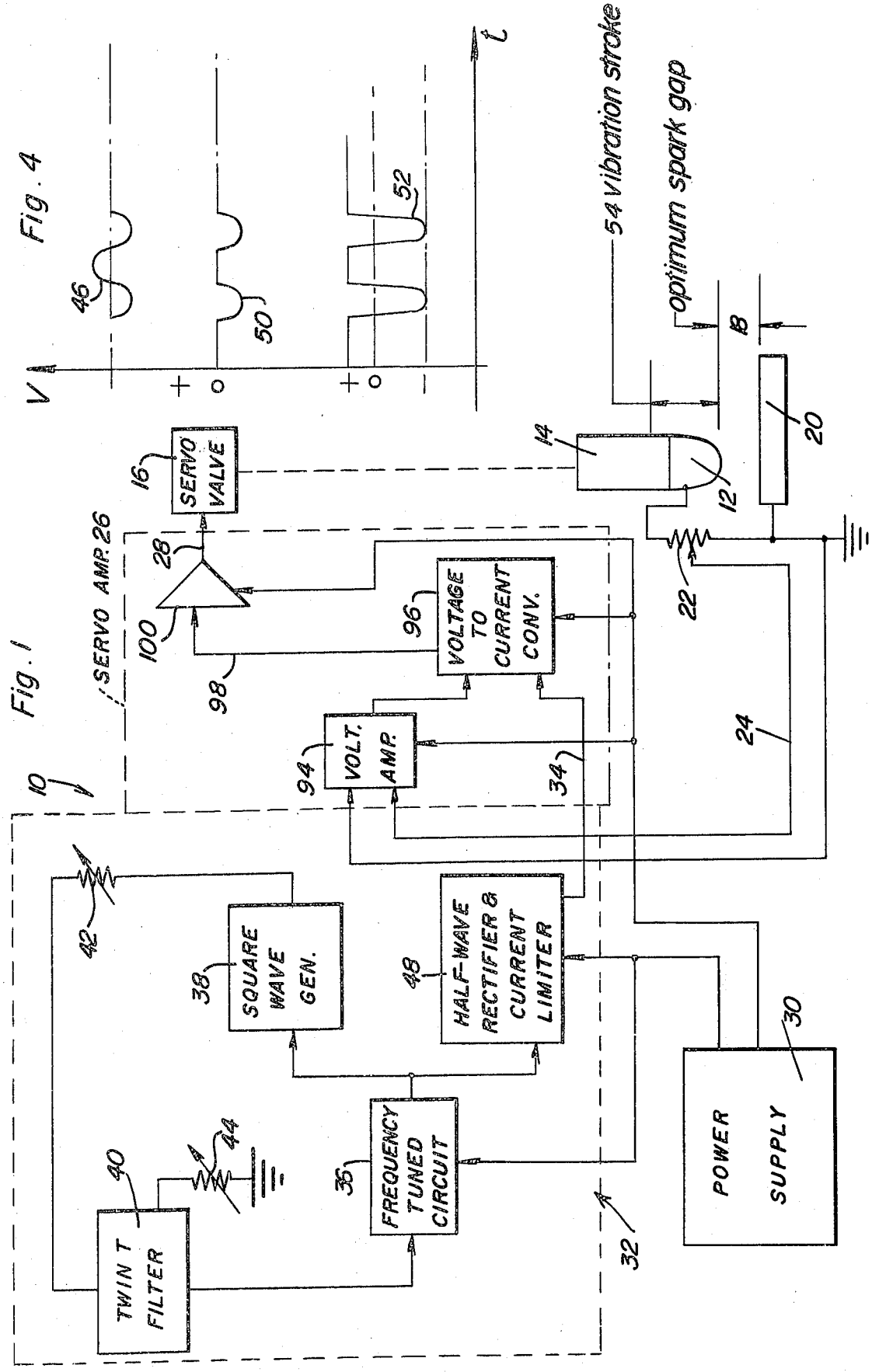

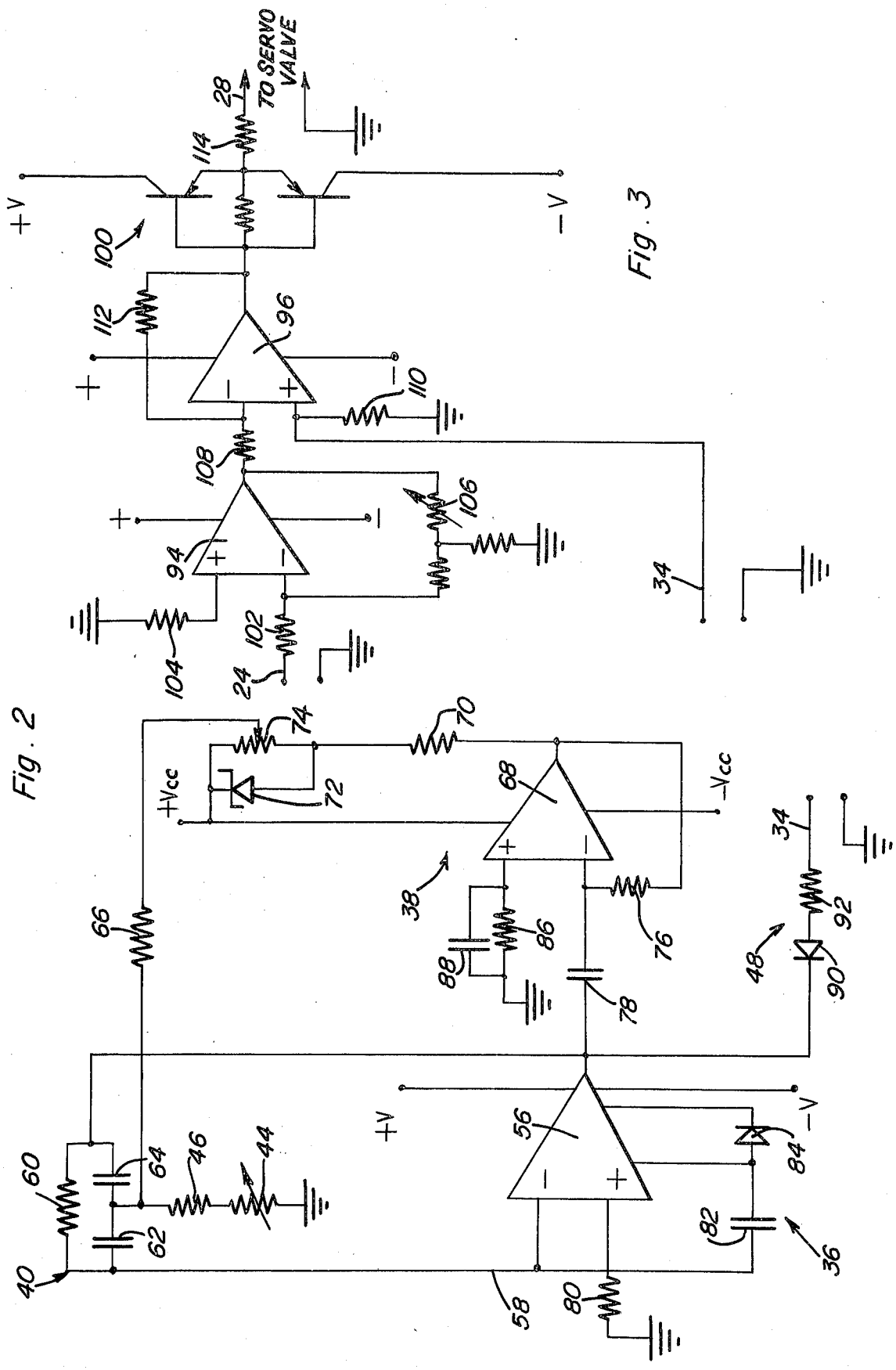

EDM ELECTRODE VIBRATION CONTROL SYSTEM

This invention relates in general to a vibration control system for the electrode of an electric discharge machining (EDM) apparatus.

The use of EDM apparatus for machining metal workpieces is well known and is particularly useful in the machining of relatively small parts. In the machining of fine finishes, small holes, narrow cavities, etc., flushing of material being removed is necessary. However, in view of the dimensions involved, flushing cannot be provided through the electrode or workpiece. Under such circumstances, it has been found necessary to effect relative vibration between the electrode and workpiece in order to flush material by means of a pumping action applied to the dielectric maintaining the gap area free of any accumulation of burnt particles that would cause dc arcing. The use of mechanical vibrators for this purpose has been proposed. The vibration frequency in such arrangements is usually the function of the input line frequency and the vibratory signal produced resembles a sinusodial wave form that drives the electrode past the optimum spark gap distance into the workpiece. This causes the electrode to deviate from its normal path of entry into the workpiece and results in damage to the electrode or undesired removal of material from the workpiece. It is therefore an important object of the present invention to provide a vibration control system for an EDM electrode for the purpose of flushing particles from the gap area by a pumping action without adversely affecting the control of the gap spacing by the servo control normally provided for the purpose of maintaining an optimum spark gap spacing.

In accordance with the present invention, the vibration control system is interrelated with the servo control by means of which an optimum spark gap spacing is maintained between the electrode and workpiece of an EDM apparatus. The vibration control system produces a signal which modulates the servo signal by means of which the spark gap spacing is varied in order to maintain the optimum spark gap. The vibration control signal is arranged however, to produce a vibratory stroke of preselected sonic frequency and amplitude that will not decrease the gap spacing from the spacing of the optimum spark gap. Accordingly, overshooting of the optimum gap spacing by the electrode as in the case of prior electrode vibration system, is reduced to almost zero. Further, the system of the present invention includes facilities for changing both the vibration frequency and amplitude in order to ensure proper vibration for different workpiece materials. The foregoing objective is achieved by generating a sinusoidal signal having an adjusted amplitude and frequency and rectifying this signal by eliminating the positive half cycles thereof that would case the overshoot aforementioned. This rectified modulating signal is applied to one input of a voltage-to-current converter to which a gap spacing control signal is also applied at another input producing an output that is applied to the electrode coil through the current amplifier and servo valve associated with the electrode servo control system ordinarily provided for the purpose of maintaining an optimum spark gap spacing.

These together with other objects and advantages which will become subsequently apparent reside in the details of construction and operation as more fully hereinafter and claimed, reference being had to the accompanying drawings forming a part hereof, wherein like numerals refer to like parts throughout.

FIG. 1 is a simplified electrical circuit block diagram showing the vibration control system of the present invention.

FIG. 2 is an electrical circuit diagram showing in greater detail some of the components associated with the system illustrated in FIG. 1.

FIG. 3 is an electrical circuit diagram showing in greater detail some of the other components associated with the system illustrated in FIG. 1.

FIG. 4 is a graphical illustration of some of the voltage signals associated with the system of the present invention.

Referring now to the drawings in detail, FIG. 1 illustrates an electrode control system for an EDM apparatus generally referred to by reference numeral 10. The electrode 12 schematically illustrated in FIG. 1, is vertically displaced through a coil 14 under control of a servo valve 16 in a manner well known by those skilled in the art. As is also well known, a servo signal is applied to the servo valve 16 for this purpose in order to maintain an optimum spark gap spacing 18 between the electrode 12 and a workpiece 20. This involves continuous monitoring of the spacing between the electrode and the workpiece as material is being removed from the workpiece by the electric discharge machining phenomenon. Accordingly, a servo adjustment potentiometer 22 is connected across the electrode and workpiece in order to establish a voltage control signal supplied through control line 24 to a servo amplifier 26 within which the servo signal is generated and applied to the servo valve 16 through line 28. Power for operating the servo amplifier 26 is derived from a conventional power supply 30 associated with EDM apparatus. This power supply also supplies electrical energy at the proper voltage to the vibration control component 32 from which a modulating signal is obtained and applied to the servo amplifier through modulating signal line 34 in order to produce the desired vibratory motion of the electrode relative to the workpiece.

With continued reference to FIG. 1, the vibration control component 32 includes a frequency tuned circuit 36 producing a sinusoidal output of sonic frequency. The output of the frequency tuned circuit 36 is applied to a square wave generator component 38 supplying a square wave signal to a twin T filter component 40 through an amplitude adjustment potentiometer 42. The signal derived from the square wave generator 38 is thereby operative through the filter component 40 to determine the amplitude of the signal output of the frequency tuned circuit 36. The sonic frequency of the output signal from circuit 36 on the other hand is determined through the filter component 40 and a frequency adjustment potentiometer 44. Thus, the sinusoidal signal of preselected frequency and amplitude as depicted by curve 46 in FIG. 4, is fed to the half wave rectifier and current limiter component 48 from which a modulating signal is obtained in line 34 in the form of a rectified, negative half wave signal 50 as depicted in FIG. 4 at the preselected frequency and amplitude. By virtue of this modulating signal, a vibration control signal depicted by curve 52 in FIG. 4 is applied to the servo valve 16. This signal produces vibration of the electrode 12 in such a manner as to limit the stroke 54, as shown in FIG. 1, to an increase in the optimum spark 18 only, to substantially eliminate any overshoot problem as aforementioned.

Referring now to FIG. 2, the frequency tuned circuit 36 includes an operational amplifier 56 driven by square waves supplied to its inverting input through line 58. Resistor 60 in the twin T filter component 40 is used in the dc gain loop of the operational amplifier 56 and together with capacitors 62 and 64 and resistor 66, determines the frequency of the sine wave output of the operational amplifier. Through potentiometer 44 connected to the juncture between capacitors 62 and 64 through resistor 46, the frequency of the sine wave output may be selected. The square wave which drives the operational amplifier 56 is derived from the comparator 68 and is fed through resistor 70, zener diode 72 and amplitude adjusting potentiometer 74 to the operational amplifier 56 through the twin T filter component 40. The zener diode 72 stabilizes the amplitude of the square wave. The oscillating output of the comparator 68 is insured by resistor 76 in the feedback loop of the comparator 68 and the capacitor 78 coupling the output of the operational amplifier 56 with the inverting input of the comparator 68. The foregoing arrangement maintains the comparator in the active region. The resistor 80 connected to the non-inverting input of operational amplifier 56, is used to provide a ground reference while capacitor 82 and diode 84 form part of the compensation network associated with the operational amplifier. Resistor 86 and parallel connected capacitor 88 connected between ground and the non-inverting input of caparator 68 are used to provide a dc and ac ground reference.

The sinusoidal output of the operational amplifier 56 is fed to the half wave rectifier and current limiter 48 which includes the series connected diode 90 and resistor 92. The resulting modulating signal is fed by conductor 34 to the servo amplifier component 26 as aforementioned.

Referring now to FIG. 1, the control voltage signal in line 24 representing the spacing between the electrode and workpiece, is fed to one input of a voltage amplifier 94. The output of voltage amplifier 94 is applied to the voltage-to-current converter 96 as the servo signal for controlling movement of the electrode in order to maintain the optimum spark gap. This signal is modulated by the signal applied to the voltage-to-current converter 96 through the modulating signal line 34 as aforementioned. Thus, a modulated output signal is fed from the converter 96 through line 98 to a current amplifier 100 from which a driving output signal is obtained in line 28 for the servo valve 16.

The voltage amplifier 94 more specifically shown in FIG. 3, by way of example, receives the gap spacing control signal in line 24 at its inverting input through resistor 102, a reference voltage being maintained on the non-inverting input through resistor 104. Thus, by means of the potentiometer 106, in the feedback loop of the voltage amplifier 94, signal gain may be adjusted in order to supply a proper amplified spacing control signal to the inverting input of the voltage-to-current converter 96 through resistor 108. The modulating signal in line 34, is applied to the non-inverting input of the converter 96, this non-inverting input being maintained above a predetermined potential level by the resistor 110. A feedback resistor 112 controls the gain of the converter 96 to supply the desired modulated control signal to the current amplifier 100 coupled to the output signal line 28 through resistor 114.

In summary, when the operational amplifier of the frequency tuned circuit 36 is turned on, it is driven by square waves from the voltage comparator component 38 at a frequency controlled by the filter component 40 and an amplitude controlled by the potentiometer 42 and at a a stabilized amplitude. A sine wave output obtained from the frequency tuned circuit 36 is applied to the half wave rectifier and current limiter 48 producing a signal that is a negative going half cycle wave applied to the non-inverting input of the voltage-to-current converter 96 modulating signal line 34. The gap voltage and current controlled by the potentiometer 22, which is negative at the output of the voltage amplifier 94, is fed to the inverting input of the voltage-to-current converter 96. Since the vibration control signal in modulating signal line 34 is a negative direction, the same as the gap control signal to the other input of the converter 96, the output of the converter will be positive. Thus, through simple summation, at no time can the signal supplied to the servo valve 16 be more positive than the command signal in the spark gap control signal line 24. This will insure that the vibration signal supplied to the servo valve 16 through line 28 will always cause the coil 14 to retract the electrode 12 away from the workpiece 14 in order to avoid the overshoot problem.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a servo control system for effecting relative displacement between a workpiece and an electrode as a function of the spacing therebetween to maintain an optimum spark gap; a source of electrical oscillating signals, vibration generating means connecting said source to the servo control system for modulating said relative displacement between the electrode and workpiece with a vibratory motion of preselected frequency and amplitude, and stroke control means connected to the vibration generating means for substantially preventing any reduction in the spacing between the workpiece and the electrode from a distance equal to that of the optimum spark gap, said source of oscillating signals comprising a signal generator producing a sinusoidal output, signal comparator means connected to the signal generator for regulating the output thereof at a preselected amplitude, and filter means connecting the signal comparator to the signal generator for predetermining the frequency of the output.

2. The combination of claim 1 wherein said stroke control means includes current limiting means connecting the source to the servo control system for rectifying the oscillating signal.

3. The combination of claim 2 wherein said servo control system includes means connected to the electrode and the workpiece for producing a control signal reflecting the spacing of the spark gap, servo motor means connected to the electrode for displacement thereof, and signal converter having an output connected to the servo motor means and a pair of inputs respectively connected to the source through the stroke control means and to the control signal means.

4. The combination of claim 3 wherein said stroke control means includes means for rectifying the regulated output of the signal generator.

5. In combination with a servo control system for effecting relative displacement between a workpiece and an electrode as a function of the spacing therebetween to maintain an optimum spark gap; a source of electrical oscillating signals, vibration generating means connecting said source to the servo control system for modulating said relative displacement between the electrode and workpiece with a vibratory motion of preselected frequency and amplitude, and stroke control means connected to the vibration generating means for substantially preventing any reduction in the spacing between the workpiece and the electrode from a distance equal to that of the optimum spark gap, said stroke control means including current limiting means connecting the source to the servo control system for rectifying the oscillating signal.

6. In combination with a servo control system for effecting relative displacement between a workpiece and an electrode as a function of the spacing therebetween to maintain an optimum spark gap; a source of electrical oscillating signals, vibration generating means connecting said source to the servo control system for modulating said relative displacement between the electrode and workpiece with a vibratory motion of preselected frequency and amplitude, and stroke control means connected to the vibration generating means for substantially preventing any reduction in the spacing between the workpiece and the electrode from a distance equal to that of the optimum spark gap, said servo control system including means connected to the electrode and the workpiece for producing a control signal reflecting the spacing of the spark gap, servo motor means connected to the electrode for displacement thereof, and a signal converter having an output connected to the servo motor means and a pair of inputs respectively connected to the source through the stroke control means and to the control signal means.

* * * * *